(12) United States Patent
Ott

(10) Patent No.: US 10,378,748 B2
(45) Date of Patent: Aug. 13, 2019

(54) LUMINAIRE AND METHOD FOR TEMPERATURE DETERMINATION

(71) Applicant: Eaton Protection Systems IP GmbH & Co. KG, Schönefeld (DE)

(72) Inventor: Toni Ott, Neckargemund (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/100,240

(22) PCT Filed: Sep. 10, 2014

(86) PCT No.: PCT/EP2014/002451
§ 371 (c)(1),
(2) Date: May 27, 2016

(87) PCT Pub. No.: WO2015/078536
PCT Pub. Date: Jun. 4, 2015

(65) Prior Publication Data
US 2017/0003011 A1   Jan. 5, 2017

(30) Foreign Application Priority Data

Nov. 29, 2013   (DE) .................. 10 2013 020 698

(51) Int. Cl.
*H05B 33/08* (2006.01)
*F21V 23/04* (2006.01)
(Continued)

(52) U.S. Cl.
CPC ............ *F21V 25/10* (2013.01); *F21V 29/50* (2015.01); *G01J 5/0096* (2013.01); *G01J 5/041* (2013.01);
(Continued)

(58) Field of Classification Search
None
See application file for complete search history.

(56) References Cited

U.S. PATENT DOCUMENTS 6,388,388 B1 *   5/2002   Weindorf ............ G09G 3/3406
                                                                  315/157
8,269,716 B2 *   9/2012   Shen .................... G09G 3/3406
                                                                  315/309
(Continued)

FOREIGN PATENT DOCUMENTS

CN         1670494       9/2005
CN       101124430       2/2008
(Continued)

OTHER PUBLICATIONS

Yener et al., Solar Energy Utilization, "Basic Concept and Laws of Thermal Radiation",1987, Martin Njhoff Publishers, pp. 1-10.*
(Continued)

*Primary Examiner* — Minh D A
*Assistant Examiner* — James H Cho
(74) *Attorney, Agent, or Firm* — King & Spalding LLP

(57) ABSTRACT

A luminaire comprises at least one light emitting diode (LED) as a light source. Such LED comprises a limited light emitting angle for the emitted light radiation. Outside of the light emitting angle, an infrared sensor is assigned to the light source for detecting its temperature.

14 Claims, 2 Drawing Sheets

(51) Int. Cl.
*F21Y 115/10* (2016.01)
*H05B 37/02* (2006.01)
*F21V 25/10* (2006.01)
*G01J 5/04* (2006.01)
*G01J 5/00* (2006.01)
*G01J 5/10* (2006.01)
*G01J 5/60* (2006.01)
*F21V 29/50* (2015.01)

(52) U.S. Cl.
CPC . *G01J 5/10* (2013.01); *G01J 5/60* (2013.01); *H05B 33/089* (2013.01); *H05B 33/0866* (2013.01); *H05B 33/0869* (2013.01); *H05B 37/0227* (2013.01); *F21V 23/0457* (2013.01); *F21Y 2115/10* (2016.08); *G01J 2005/608* (2013.01)

(56) References Cited

U.S. PATENT DOCUMENTS

| | | | |
|---|---|---|---|
| 9,230,943 B2* | 1/2016 | Harbers | F21K 9/54 |
| 2004/0178737 A1* | 9/2004 | Takeda | B60Q 1/00 |
| | | | 315/77 |
| 2005/0156531 A1 | 7/2005 | Young | |
| 2006/0192125 A1 | 8/2006 | Yoganandan et al. | |
| 2008/0157698 A1 | 7/2008 | Tan et al. | |
| 2009/0302766 A1* | 12/2009 | Behr | B60Q 1/0023 |
| | | | 315/82 |
| 2010/0084979 A1 | 4/2010 | Burton et al. | |
| 2013/0082616 A1 | 4/2013 | Bradford et al. | |
| 2013/0181611 A1* | 7/2013 | Pan | H05B 33/0851 |
| | | | 315/151 |

FOREIGN PATENT DOCUMENTS

| | | |
|---|---|---|
| DE | 3716251 | 12/1988 |
| DE | 19756953 | 7/1998 |
| DE | 10031303 | 1/2002 |
| DE | 102004060890 | 6/2006 |
| DE | 102010005088 | 7/2011 |
| EP | 0516398 | 12/1992 |

OTHER PUBLICATIONS

Machine translation of DE 102010005088A1, via LexsisNexis Total Patent, 5 pages.
Machine translation of DE 102004060890A1, via LexsisNexis Total Patent, 17 pages.
Machine translation of DE 10031303A1, via LexsisNexis Total Patent, 9 pages.
Machine translation of DE 3716251A1, via LexsisNexis Total Patent, 6 pages.
Schmidt, Charlotte, International Search Report issued in International Patent Application PCT/EP2014/002451, completion date Nov. 18, 2014, dated Nov. 28, 2014, 4 pages, European Patent Office.
Machine translation of DE19756953, via LexisNexis Total Patent, 6 pages.
Chinese Office Action issued in Application No. 201480065261.X, dated Jun. 19, 2018, 7 pages, The State Intellectual Property Office of the People's Republic of China, with English translation 10 pages.
Machine translation of CN101124430 via LexisNexis Total Patents, Aug. 23, 2018, 18 pages.
Machine translation of CN1670494 via LexisNexis Total Patents, Aug. 23, 2018, 15 pages.

* cited by examiner

LUMINAIRE AND METHOD FOR TEMPERATURE DETERMINATION

PRIORITY CLAIM

The present application is national phase application of and claims priority to International Application No. PCT/EP2014/002451 with an International filing date of Sep. 10, 2014, which claims priority to German Patent Application No. 10 2013 020 698.7, filed on Nov. 29, 2013. The foregoing applications are hereby incorporated herein by reference.

TECHNICAL FIELD

The invention refers to a luminaire with at least one LED (light emitting diode) as a light source. Such a light source has a limited light emitting angle for emitted light radiation.

BACKGROUND

The invention refers to a luminaire with at least one LED (light emitting diode) as a light source. Such a light source has a limited light emitting angle for emitted light radiation.

A corresponding emitting angle for such an LED is, for example, between 15° and 120°, wherein such emitting angle generally is determined by a little lens structure of the LED. Concerning such light sources, it has to be considered, that even in the case that the efficiency is relatively high, with such LEDs, for example, a maximum of 20% of the input energy is converted to visible light. The remaining energy input is converted to heat. To avoid any damage to the LED by such produced heat, this heat will generally be dissipated by a cooling body, active cooling, liquid cooling, or the like. Otherwise, the lifetime of such an LED and also its light output will be negatively influenced or reduced by such high heat input. As a rule it might be said that at temperatures of 120° C. or more, a corresponding semiconductor crystal of the LED is damaged resulting in permanent impairment to functional life, light color, light output or other drawbacks to the LED. In the case of explosion-proof luminaires, it has to be considered that by passing a critical temperature value such an LED will have a particular ignition effectiveness, which can result in danger to body and life. To prevent this, suitable measurements have to be taken to prevent an overrun of such critical temperature (generally temperatures classes or ignition temperature of a gas-air mixture, in which the explosion protection operation means is used).

SUMMARY

It is an object of the invention to render a temperature monitoring of the LED possible in order to prevent corresponding damage.

This object is solved by the features of claim 1 or the features of claim 10.

According to the invention, the luminaire comprises an infrared sensor outside of the light emitting angle of the light source, which sensor is assigned to the light source for contactless determination of its temperature.

According to the method of the invention, such infrared sensor is arranged outside of the light emitting angle of the light source, a heat radiation of the light source is measured by the infrared sensor, and the infrared sensor signal is evaluated for temperature determination of the light source.

By the arrangement of the infrared sensor outside of the corresponding light emitting angle, there will be no heating of the infrared sensor by the light radiation. Instead, the infrared sensor will detect the heat radiation emitted by the light source. In this respect, it is further said that a body that is heated will generally emit a so-called black-body radiation, which has a very characteristic spectrum, only dependant on the temperature of the corresponding body. Under 600° C., such black-body radiation is in the infrared part of the spectrum and not visible. Moreover, such black-body radiation is emitted in a broad area which exceeds the corresponding light emitting angle. Theoretically, such black-body radiation is emitted in all of the space around the heated body.

Since generally a corresponding cooling body, or the like, is arranged on the side of the light source opposite the light emitting direction leading to an advantageous arrangement of the infrared sensor, which is essentially orthogonal to the medium emitting direction proximate the light source. In such a way the heat radiation of the light source can be detected without influence of the cooling body and simultaneously the infrared sensor is arranged outside of the light emitting angle of the light source.

Such a light emitting angle is, for example, 120°. This means that with respect to a perpendicular emission of the light source there is on both sides a light emitting angle of 60°. The arrangement of the corresponding infrared sensor might be, in such a case, at 90°.

Such a luminaire can include not only one LED (2), but also several of those light sources. This means that a corresponding light source (3) according to the invention might be an LED-spot light, an LED-spot, an LED-strip, and LED-ribbon, or the like. In this connection it is sufficient when only one of the LEDs (2) of all LEDs (2) is monitored by such an infrared sensor (6). It is also feasible that two or more infrared sensors (6) are correspondingly distributed around a light source (3) consisting, for example, of several LEDs (2). Also feasible is that a light guide (16) is assigned to each LED (2) allowing the simultaneous detection of the emitted infrared parts (14) of all LEDs (2) and at an exit (15) of such light guide (16), the corresponding infrared sensor (6) can be arranged, as illustrated in FIG. 2.

To allow an evaluation of the heat radiation within the luminaire, or at least close to the luminaire, such infrared sensor might be connected with an evaluation/control means for determination of temperature and control of the light source. This means that by such evaluation/control means, the temperature might be determined from the corresponding infrared signal, will possibly be displayed or will be transmitted to a remote location. Moreover, the evaluation/control means may also be used for control of the light source. Such a control may be of advantage when a maximum temperature threshold is pre-set for the evaluation/control means as a switch-off value. In case a temperature is detected, during the temperature determination, which is higher than this temperature threshold, the light source will be switched off or, when necessary, the complete luminaire.

In this connection, it should also be considered that a temperature increase of the light source might also take place without its operation if, for example, the luminaire and in particular the light source is the object of external radiation, like sun radiation. In the case of external luminaires, it was determined that, for example, in summer the mere radiation of the sun can result in temperatures in excess of 70° C. Also by measuring such temperature, it is possible with the evaluation/control means to initiate a forced cooling of the light source or of the luminaire in total.

In connection with such sun radiation, it might be a disadvantage when the infrared sensor not only detects the heat of the light source, but also the ambient temperature. The infrared sensor may be screened with respect to such ambient temperature radiation to avoid this influence.

A further means to consider such ambient heat radiation might be that a second radiation sensor is assigned to the infrared sensor for detecting and compensating the ambient heat radiation. This means that the second infrared sensor is, in particular, directed to the exterior and detects, for example, the ambient heat radiation reaching the luminaire or light source, for example, by sun radiation. This radiation is detected and used for compensation of the temperature measurement of the light source by means of the other infrared sensor.

A weighting of the heat radiation may be done concerning the infrared sensor assigned to the light source and the infrared sensor assigned to the outside. Such weighting may for example be dependent on the position of the sun or may consider changing ambient temperature in another way.

According to the method of the invention, it is further said that, see also the comments set forth above, a corresponding switching off of the light source might take place by for instance the evaluation/control means, in case the measured temperature value is higher than a pre-set maximum temperature threshold.

Moreover, a corresponding screening of the infrared sensor with respect to ambient heat radiation might be realized by a cooling body or the like. In some cases the arrangement of a corresponding foil might be sufficient.

It also might be considered as advantageous to have at least one of the used infrared sensors arranged in an adjustable way. This would mean that the sensor could, for example, be assigned to another light source or could be varied in its orientation with respect to the light source, should this be necessary for the temperature distribution within the luminaire, the generation of heat by different light sources or when accounting for the external heat radiation.

This feature can also be applied to all used infrared sensors.

BRIEF DESCRIPTION OF THE DRAWING

In the following an advantageous embodiment of the invention will be described with respect to the figures.

DETAILED DESCRIPTION OF EXAMPLE EMBODIMENTS

Figure 1:
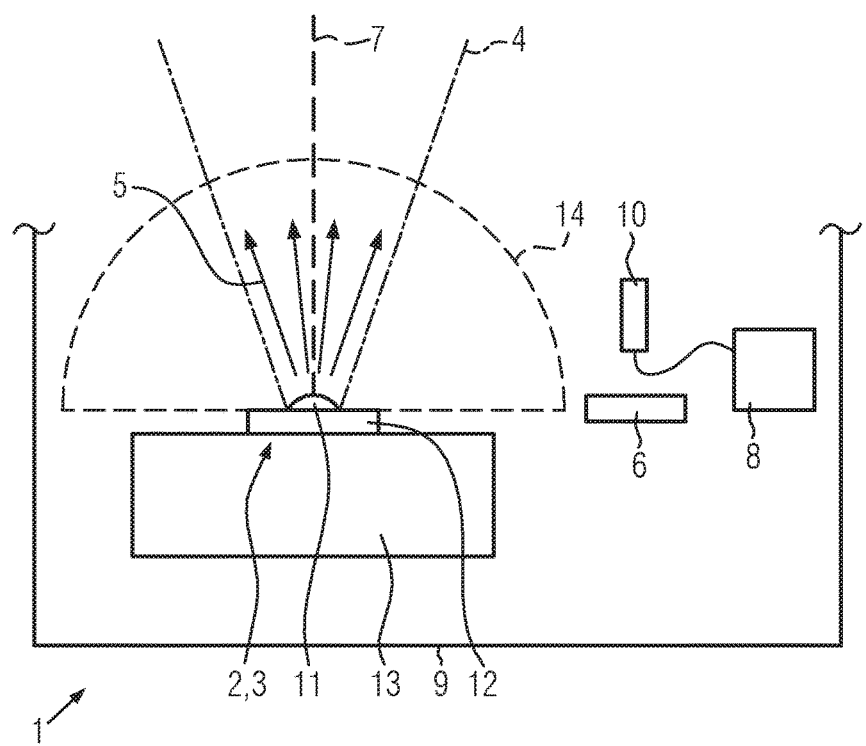
FIG. 1 is a principle illustration of a luminaire with an infrared sensor according to the invention.
Figure 2:
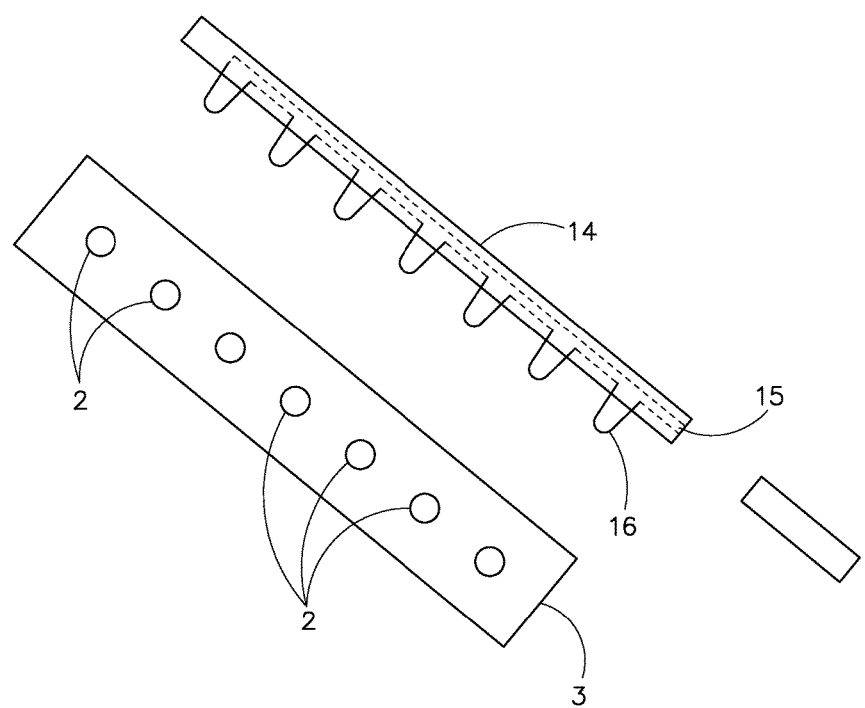
FIG. 2 illustrates another example embodiment of a luminaire with an infrared sensor and light guides, according to the example embodiments of the present disclosure.

In FIG. 1, a part-sectional view of luminaire 1 with a temperature determination of a light source according to the invention is illustrated. Luminaire 1 has a luminaire housing 9 and a light source 3 arranged therein. A corresponding light exit opening of the luminaire or the luminaire housing is not further illustrated. However, this can be arranged in a normal way in the direction of the light radiation emitted by the light source 3. Moreover, in FIG. 1, only one light source in the form of a light emitting diode (LED) 2 is illustrated. Of course, several such LEDs may be arranged in the form of strips or ribbons.

The LED 2 generally consists of a printed circuit board 12 with a corresponding semi-conductor and a lens means 11 for dissipating or collecting the emitted light. With such an LED 2, corresponding light rays 5 will be emitted in a particular space area which is defined by the illustrated emitting angle 4. This angle depends on the LED and the corresponding lens means 11, for example 15° to 120°. A medial emitting direction 7 which, as a rule, extends perpendicular from the light source 3, is determined by the corresponding emitting angle 4.

By use of the light source or by radiation directed to the light source from the outside, see for example, sun radiation, the temperature of the LED will rise. In this connection, it has to be considered that, for example, the light flux amount of an LED strongly depends on the barrier layer temperature. The higher the temperature of the LED, the smaller the light flux is, the shorter the functional life becomes, and a change in the light color may result. For the corresponding cooling, a cooling device 13 is assigned to the LED, which can, for example be a ribbed cooling body, and active cooling, for example, also with cooling fluid or the like. In case the LED is heated, it corresponds essentially to a black body which emits corresponding black body radiation during heating in addition to the light radiation. Such a black body radiation has a very characteristic spectrum, which only depends upon the temperature of the corresponding body. In the temperature range according to the invention, this black body radiation is in the infrared range.

Thus, according to the invention, an infrared sensor 6 is assigned to the light source 2, which sensor detects such black body radiation in the infrared range.

By the arrangement of the cooling device 13, such corresponding black body radiation, which corresponds to the temperature of the light source 2, is essentially emitted only an upper half space of the cooling device 13, see reference numeral 14, which designates the emitting angle of the black body radiation.

In the area of this emitting angle, the infrared sensor 6 is arranged, such that the temperature of the light source 2 can be detected by this sensor.

Infrared sensor 6 can be arranged in such a way that it is arranged within the radiation area of the black body radiation, which means of the heat radiation, but is not arranged in the area of the light radiation, see the corresponding emitting angle 4.

The infrared sensor 6 is connected to an evaluation/control means 8. By this means the corresponding infrared signals are received and are converted into temperature values. The corresponding temperature values are in particular compared to a maximum temperature threshold. In case the detected temperature the light source 2 is higher than this maximum temperature threshold, the luminaire in particular the light source, can be switched off by the evaluation/control means.

It was already said that a corresponding light source 2 may also be passively heated by radiation from the outside, see for example sun radiation. This heating might negatively influence the light source, which may endanger its operation. Also in such a case, the temperature can be detected by the infrared sensor 6 and result in the initiating of an active cooling of the light source by the evaluation/control means.

The corresponding heat radiation from the outside corresponds to an ambient heat radiation, which will be screened during temperature measurement of the light source or will be considered during temperature measurement. For suppressing such ambient heat radiation, it is possible to for example, assign a screening to the infrared sensor 6 in the form of a covering, a foil, a cooling body or the like. This will guarantee that the ambient heat radiation does not directly reach the infrared sensor 6.

It is also possible that the ambient heat radiation will be detected by a further second infrared sensor 10. This is, in particular, directed to the ambient heat radiation and detects same. By the measurement values of both infrared sensors 6 and 10, then a compensation of the ambient heat radiation during detecting of the temperature of the light source may be attained. Both infrared sensors transmit corresponding sensor values to the evaluation/control means 8.

It is further to be noted that in FIG. 1 essentially only one light source is illustrated as well as only one infrared sensor 6 or infrared sensor 10, respectively. Of course, it is possible to use several light sources with just one infrared sensor 6 or also in combination with several of such infrared sensors 6. This is also valid for the second infrared sensor 10, from which also several might be used, to detect ambient heat radiation from the outside coming from different regions.

According to the invention, sure detection of temperature of the corresponding light source is performed to prevent, for example, overheating of same. Thus, the light output, functional life and also the light color are protected in view of a negative influence by overheating the light source. Such a temperature measurement has a particular advantage in hazardous areas, to avoid ignition by such overheated light source.

The invention claimed is:

1. A luminaire comprising:
 a housing;
 an infrared sensor that is disposed in the housing; and
 a light source assembly disposed in the housing, wherein the light source assembly comprises:
  a circuit board having a first surface and a second surface that is opposite to the first surface;
  at least one light emitting diode (LED) as a light source disposed on the first surface of the circuit board, wherein the at least one LED has a light emitting angle for an emitted light radiation; and
  a cooling device disposed on the second surface of the circuit board that is opposite to a direction of the emitted light radiation,
   wherein the infrared sensor is detached from the light source assembly and is configured for contactless determination of temperature of the at least one LED by detecting black body radiation of the at least one LED, and
   wherein the infrared sensor is disposed within an area of the black body radiation of the at least one LED and outside of the light emitting angle of the at least one LED; and
  a second infrared sensor that is configured to measure ambient heat radiation for compensation of the ambient heat radiation,
   wherein compensating for the ambient heat radiation comprises assigning weights to: a value of the black body radiation of the light source that is detected by the infrared sensor, and a value of the ambient heat radiation from an external source that is detected by the second infrared sensor,
    wherein the external source is the sun, and
    wherein the weights are assigned based on a position of the sun.

2. The luminaire according to claim 1, wherein the infrared sensor is essentially arranged orthogonal to a medium emitting direction next to the light source.

3. The luminaire according to claim 1, characterized in that said light source is an LED-spot light, an LED-strip, or an LED-ribbon.

4. The luminaire according to claim 1, wherein the infrared sensor is connected to a controller for temperature determination and control of the light source.

5. The luminaire according to claim 4, wherein the controller has a pre-set maximum temperature threshold as a switch-off value for the light source.

6. The luminaire according to claim 1, wherein the infrared sensor is screened with respect to the ambient heat radiation.

7. The luminaire according to claim 1, wherein the infrared sensor is adjustably arranged.

8. A method for temperature control of at least one LED as a light source of a luminaire with the following steps:
 i) arranging an infrared sensor within an area of black body radiation of the light source and outside a light emitting angle of the light source, wherein the infrared sensor is disposed in a housing of the luminaire and detached from a light source assembly that comprises:
  the light source that is disposed in the housing, and
  a cooling device on which the light source is disposed,
   wherein within the housing, the light source assembly is positioned relative to the therefrom detached infrared sensor such that the cooling device of the light source assembly is disposed outside an area of the black body radiation that is detected by the infrared sensor;
 ii) measuring a black body radiation of the light source by the infrared sensor,
 iii) evaluating an infrared signal of the infrared sensor for contactless determination of temperature of the light source using the black body radiation of the light source; and
 iv) measuring ambient heat radiation by a second infrared sensor for compensation of the ambient heat radiation,
  wherein the compensation of the ambient heat radiation based on a measurement of the ambient heat radiation by the second infrared sensor comprises:
   assigning weights to: a value of the black body radiation of the light source that is detected by the infrared sensor, and a value of the ambient heat radiation from an external source that is detected by the second infrared sensor,
    wherein the external source is the sun, and
    wherein the weights are assigned based on a position of the sun.

9. The method according to claim 8, characterized by the further step of:
 switching off of the light source in case the detected temperature value is higher than a pre-set maximum temperature threshold.

10. The method according to claim 8, characterized by the step of:
 screening the infrared sensor with respect to the ambient heat radiation.

11. The method according to claim 8, characterized by the further step of:
 assigning the infrared sensor to an LED-spot light, an LED-strip, or an LED-ribbon as a light source.

12. The method according to claim 8, characterized in that a light guide is assigned to each LED of a plurality of LEDs for simultaneously detecting emitted infrared parts of all LEDs, wherein at a corresponding exit end of the light guide the infrared sensor is isolated with respect to the ambient radiation.

13. A luminaire comprising:
a housing;
a first infrared sensor that is disposed in the housing; and
a light source assembly that is disposed in the housing, wherein the light source assembly comprises:
  a circuit board having a first surface and a second surface that is opposite to the first surface;
  at least one light emitting diode (LED) as a light source disposed on the first surface of the circuit board, wherein the at least one LED has a light emitting angle for an emitted light radiation; and
  a cooling device disposed on the second surface of the circuit board that is opposite to a direction of the emitted light radiation,
    wherein the first infrared sensor is detached from the light source assembly such that the first infrared sensor is not mounted on the cooling device of the light source assembly and is configured for contactless determination of temperature of the at least one LED by detecting black body radiation of the at least one LED,
    wherein the first infrared sensor is disposed within an area of the black body radiation of the at least one LED and outside of the light emitting angle of the at least one LED, and
  a second infrared sensor that is configured to measure ambient heat radiation for compensation of the ambient heat radiation,
    wherein compensating for the ambient heat radiation comprises assigning weights to: a value of the black body radiation of the light source that is detected by the infrared sensor, and a value of the ambient heat radiation from an external source that is detected by the second infrared sensor,
    wherein the external source is the sun, and
    wherein the weights are assigned based on a position of the sun.

14. The luminaire of claim 13, wherein the first infrared sensor is not in thermal conductive contact with the cooling device of the light source assembly.

* * * * *